(12) United States Patent
Tsutsui

(10) Patent No.: US 8,422,849 B2
(45) Date of Patent: Apr. 16, 2013

(54) IMAGE PLAYBACK APPARATUS, IMAGE RECORDING APPARATUS, IMAGE PLAYBACK METHOD, AND IMAGE RECORDING METHOD

(75) Inventor: Masanao Tsutsui, Kanagawa (JP)

(73) Assignee: Sony Corporation (JP)

( * ) Notice: Subject to any disclaimer, the term of this patent is extended or adjusted under 35 U.S.C. 154(b) by 901 days.

(21) Appl. No.: 12/231,860

(22) Filed: Sep. 5, 2008

(65) Prior Publication Data
US 2009/0067815 A1    Mar. 12, 2009

(30) Foreign Application Priority Data

Sep. 10, 2007 (JP) ................ P2007-233689

(51) Int. Cl.
*H04N 5/765* (2006.01)

(52) U.S. Cl.
USPC ............ 386/117; 386/45; 386/95; 348/231.2; 700/94

(58) Field of Classification Search ............ 386/117
See application file for complete search history.

(56) References Cited

U.S. PATENT DOCUMENTS

| 2004/0122539 A1* | 6/2004 | Ainsworth ............ 700/94 |
| 2004/0218894 A1* | 11/2004 | Harville et al. ........ 386/46 |
| 2005/0083414 A1 | 4/2005 | Hidaka et al. |
| 2005/0259164 A1* | 11/2005 | Kudo ............. 348/231.2 |
| 2006/0045488 A1* | 3/2006 | Maeda ............. 386/95 |

FOREIGN PATENT DOCUMENTS

| JP | 2004-201170 A | 7/2004 |
| JP | 2005-303883 A | 10/2005 |
| JP | 2005-333557 A | 12/2005 |
| JP | 2006-072736 A | 3/2006 |

* cited by examiner

*Primary Examiner* — Catherine Thiaw
*Assistant Examiner* — Syed Zaidi
(74) *Attorney, Agent, or Firm* — Lerner, David, Littenberg, Krumholz & Mentlik, LLP

(57) ABSTRACT

An image playback apparatus includes an image acquisition unit configured to acquire image content including still images and movies and photographing information involved in photographing a subject to create the image content, an image classifying unit configured to classify the image content into a plurality of image groups on the basis of the photographing information, and an image playback unit configured to organize all still images belonging to one of the image groups into a still-image slideshow and successively playing back one or a plurality of movies belonging to the one image group and the still-image slideshow.

15 Claims, 4 Drawing Sheets

IMAGE PLAYBACK APPARATUS, IMAGE RECORDING APPARATUS, IMAGE PLAYBACK METHOD, AND IMAGE RECORDING METHOD

CROSS REFERENCES CROSS-REFERENCE TO RELATED APPLICATIONS

The present application claims priority from Japanese Patent Application No. JP 2007-233689, filed in the Japanese Patent Office on Sep. 10, 2007, the entire content of which is incorporated herein by reference.

BACKGROUND OF THE INVENTION

1. Field of the Invention

The present invention relates to an image playback apparatus, an image recording apparatus, an image playback method, and an image recording method that allow playback and recording of content including still images and movies.

2. Description of the Related Art

Recent digital imaging devices have a function of a digital still camera and a function of a digital video camera, and are designed to enable users to easily shoot both still images and movies. Various slideshow functions have been proposed as methods for editing and playing back such content including both still images and movies. For example, Japanese Unexamined Patent Application Publication No. 2004-201170 discloses a recording apparatus having a slideshow function.

SUMMARY OF THE INVENTION

Most playback apparatuses employ a system in which movies and still images are sequentially played back in order of photographing time. In this system, a still image is played back simply in such a manner that the same image is continuously played back for several seconds. A function for organizing a set of still images into a slideshow with background music (BGM) has also been proposed. In this function, within content including both still images and movies, only the still images are used and effects are applied to a plurality of still images so that the still images with the effects applied are converted into a slideshow which is played back in time with music. In general, for example, content photographed during an event such as a trip includes both still images and movies which are closely related to each other. Nevertheless, the simple function of producing a slideshow using only the still images, without taking the movies into account, is not satisfactory. Furthermore, in a case where still images are contained in movies, playback of the still images one by one would not produce a satisfactory slideshow even if effects are applied. For example, at least two still images are necessary to realize a fading effect. In a case where photographed content is recorded on a digital versatile disc (DVD) or the like, all movies and still images included in the content are written to the same DVD. There is a demand for an effective playback system in which all the movies and still images included in the image content are utilized.

In DVD camcorders, when still images and movies photographed in the same situation are to be recorded on a DVD, all the still images are recorded together on the DVD as a single slideshow. However, such a straightforward system may be unsuitable for, for example, image content including still images that were photographed during different trips or image content including still images that were photographed at different places during the same trip. In an existing slideshow function, all still images included in image content, which were photographed in different situations, are organized together into a slideshow, and the slideshow may be boring. Such a function is not suitable for playback of still images and movies together, which were photographed with a range of conditions that are temporally or spatially close to each other.

Japanese Unexamined Patent Application Publication No. 2005-303883 discloses a system in which a plurality of still images are classified according to years when the still images were acquired to create a slideshow which is then recorded on a DVD or the like. However, this system focuses only on a time-based relationship to provide a slideshow, and does not solve the problem of effective playback of still images contained in movies.

It is therefore desirable to provide playback and recording systems that enable effective playback and recording of content including both movies and still images. According to an embodiment of the present invention, an image reproducing apparatus includes image acquisition means for acquiring image content including still images and movies and photographing information involved in photographing a subject to create the image content, image classifying means for classifying the image content into a plurality of image groups on the basis of the photographing information, and image playback means for organizing all still images belonging to one of the image groups into a still-image slideshow and successively playing back one or a plurality of movies belonging to the one image group and the still-image slideshow.

Preferably, the image classifying means classifies the image content into a plurality of image groups on the basis of photographing information concerning at least one of a photographing date when the subject was photographed, a photographing time when the subject was photographed, and a photographing location where the subject was photographed. The image playback means may obtain a photographing time of a still image that was first photographed among the still images organized into the still-image slideshow, and photographing times of the one or plurality of movies belonging to the one image group, and chronologically plays back the one or plurality of movies and the still-image slideshow according to the obtained photographing times.

According to another embodiment of the present invention, an image recording apparatus includes image acquisition means for acquiring image content including still images and movies, and photographing information involved in photographing a subject to create the image content, image classifying means for classifying the image content into a plurality of image groups on the basis of the photographing information, slideshow movie generating means for organizing all still images belonging to one of the image groups to generate a slideshow movie, playlist generating means for generating a playlist that defines an order in which one or a plurality of movies belonging to the one image group and the slideshow movie are successively played back, and recording means for recording the slideshow movie, the one or plurality of movies, and the playlist onto a recording medium.

Preferably, the image classifying means classifies the image content into a plurality of image groups on the basis of photographing information concerning at least one of a photographing date when the subject was photographed, a photographing time when the subject was photographed, and a photographing location where the subject was photographed. The playlist generating means may obtain a photographing time of a still image that was first photographed among the still images organized into the slideshow movie, and photographing times of the one or plurality of movies belonging to the one image group, and may generate a playlist that defines an order in which the one or plurality of movies and the slideshow movie are chronologically played back according to the photographing times. The playlist generating means may generate a playlist menu for each of the image groups obtained by the image classifying means. In this case, the playlist generating means may generate a playlist menu that is segmented for every predetermined number of images within each of the image groups obtained by the image classifying means. Alternatively, the playlist generating means may generate a playlist main menu for each of the image groups obtained by the image classifying means, and may further generate as a link from the playlist main menu a playlist submenu that is segmented for every predetermined number of images. Furthermore, the playlist generating means may generate still image entries and movie entries in the playlist menu, and may place a link from each of the still image entries in the menu to a corresponding position within a slideshow movie including a still image associated with the linked still image entry so that, when one of the still image entries is selected in the menu, playback can be started from the corresponding position within the slideshow movie. In the case of creating a menu for each of the image groups obtained by the image classifying means, the playlist generating means may handle still images included in each of the image groups as a slideshow movie and may generate a playlist menu.

According to still another embodiment of the present invention, an image recording apparatus includes image acquisition means for acquiring image content including still images and movies, and photographing information involved in photographing a subject to create the image content, image classifying means for classifying the image content into a plurality of image groups on the basis of the photographing information, slideshow movie generating means for organizing all still images belonging to each of the image groups to generate a slideshow movie, playlist generating means for generating a playlist that defines an order in which one or a plurality of movies belonging to the same image group as the image group to which the still images belong and the slideshow movie are successively played back, playback menu generating means for creating a map on the basis of locations where individual images defined in the playlist were photographed, and combining the playlist and the map to generate a playback menu, and recording means for recording the slideshow movie, the one or plurality of movies, and the playback menu onto a recording medium.

Preferably, the image classifying means classifies the image content into a plurality of image groups on the basis of photographing information concerning at least one of a photographing date when the subject was photographed, a photographing time when the subject was photographed, and a photographing location where the subject was photographed.

According to an embodiment of the present invention, even image content including both still images and movies can be played back using all the images included in the image content. Still images contained in movies can be played back as a slideshow within a certain range (i.e., an image group) on the basis of photographing information such as photographing locations and photographing times. For example, in a case where content includes both movies and still images that were photographed at a certain sightseeing place, the still images that were photographed at that sightseeing place are extracted and are organized into a slideshow. Movies to be played back together with the slideshow are temporally and spatially related to the slideshow. Therefore, effective playback in accordance with a real experience of the photographer can be achieved. In addition, a still-image slideshow and a movie, which are related to each other, can be played back using a monitor of a photographing device and can also be recorded on a DVD or the like so that they can be easily played back using another video device.

Furthermore, when a movie and a still-image slideshow are recorded on a DVD or the like, a menu is also recorded. A menu is created for each group that is based on photographing information. Thus, easy-to-use menus can be obtained. The menu of the DVD includes a main menu and submenus associated with each image group obtained on the basis of photographing information, and those menus are easy to view and easy to use. Submenus are configured such that images classified into each image group are further divided into three segments, and a user can easily specify an image to be played back while viewing thumbnails or the like thereof. Although individual still images are assembled into a slideshow movie, thumbnails of all the original still images are shown on the menu. One of the thumbnails is specified so that the desired still image can be played back directly from a corresponding position in the still-image slideshow movie. Therefore, a DVD in which movies and still images are merged can be created.

Moreover, a map or the like can be used to form a background of a menu to provide fruitful additional information. Since such a map is shown on every submenu, a detailed map for each place where photographing was performed (for example, sightseeing place) can be shown.

DESCRIPTION OF THE PREFERRED EMBODIMENTS

Figure 1:
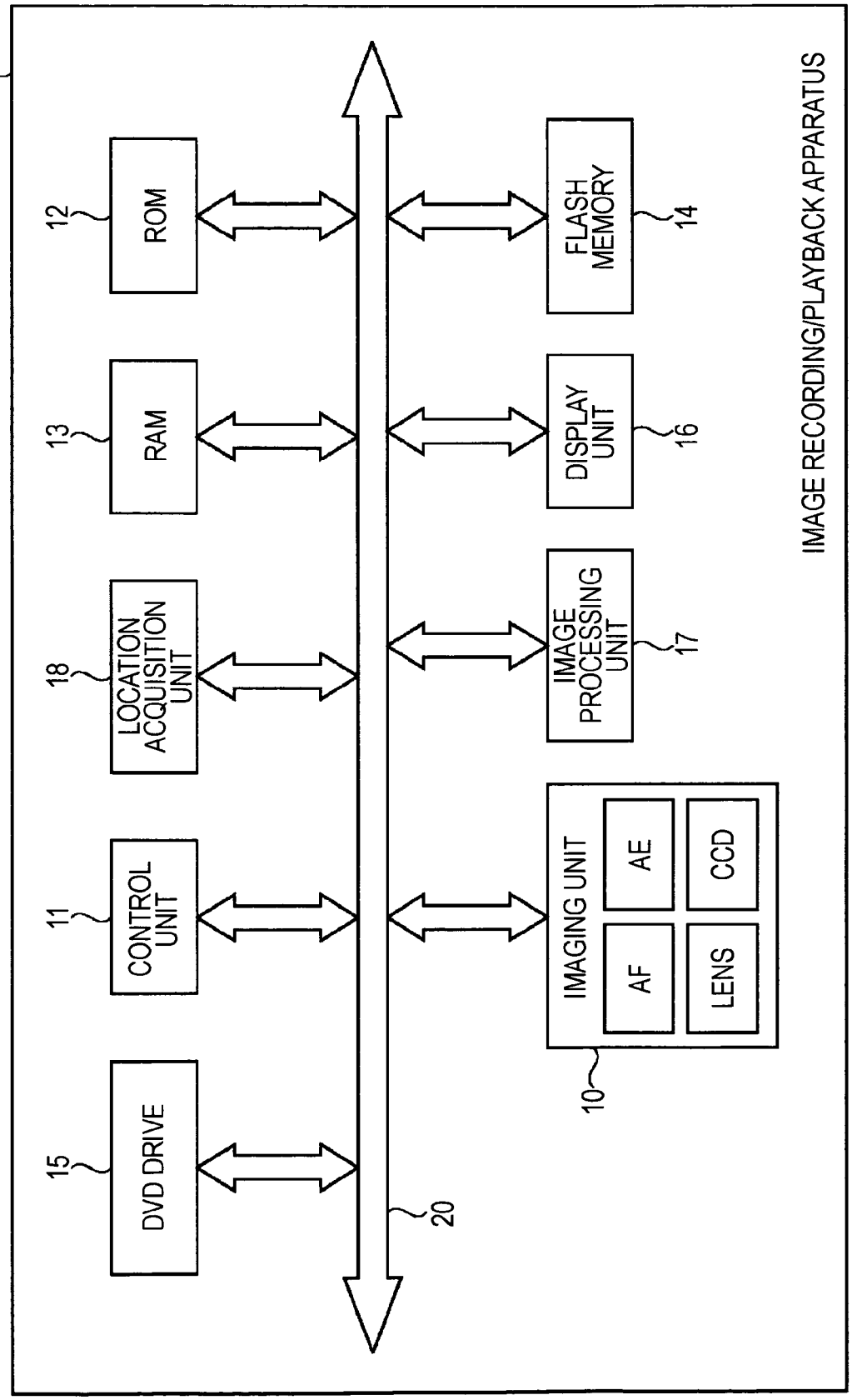
FIG. 1 is a block diagram illustrating an overall structure of an image recording/playback apparatus according to an embodiment of the present invention.

An embodiment of the present invention will be described in detail hereinafter with reference to the drawings. FIG. 1 is a block diagram illustrating an overall structure of an image recording/playback apparatus 1 according to an embodiment of the present invention. The image recording/playback apparatus 1 functions as an image playback apparatus and an image recording apparatus. As illustrated in FIG. 1, the image recording/playback apparatus 1 includes an imaging unit 10, a control unit 11, a read-only memory (ROM) 12, a random access memory (RAM) 13, a flash memory 14, a DVD drive 15, a display unit 16, an image processing unit 17, and a location acquisition unit 18. The imaging unit 10, which forms image acquisition means, includes a lens, an imaging element such as a charge-coupled device (CCD) sensor, an automatic focusing (AF) mechanism, and an automatic exposure (AE) mechanism. The imaging unit 10 photographs a subject to generate image content.

The control unit 11 includes a central processing unit (CPU), and executes a predetermined program to control the overall operation of the image recording/playback apparatus 1 or to perform control tasks of the individual units. The program executed by the CPU is stored in the ROM 12. The RAM 13 is used as a work area when the CPU of the control unit 11 executes the program. The flash memory 14 records the image content generated by the imaging unit 10. The ROM 12 stores the program executed by the CPU 11 and various types of data. For example, the ROM 12 stores map data, which is used to play back the image content and to create a playback menu.

The DVD drive 15 provides recording means for recording the image content generated by the imaging unit 10 onto a recording medium. The recording medium may be a DVD. The display unit 16 is formed of, for example, a liquid crystal display (LCD), and provides image playback means for playing back the image content. The image processing unit 17 performs image processing on the image content generated by the imaging unit 10 so as to conform to the playback and recording formats. In the present embodiment, the image processing unit 17 forms slideshow movie playback means for generating a slideshow movie, and a portion of image playback means for successively playing back a plurality of movies and a still-image slideshow.

The location acquisition unit 18 is formed of, for example, a global positioning system (GPS) receiver, and sequentially acquires location information of the image recording/playback apparatus 1 from a GPS satellite. The location information is used to specify a photographing location at which a movie or a still image was photographed by the imaging unit 10, and forms a portion of photographing information. The control unit 11 further includes an internal timer that can measure the date and time. Information regarding the date and time is used to specify a photographing time, and also forms a portion of the photographing information.

The image recording/playback apparatus is provided with a playback section that includes image acquisition means (the imaging unit 10), image playback means (the image processing unit 17 and the display unit 16), and image classifying means (the control unit 11). The image acquisition means acquires image content including both still images and movies, and photographing information involved in photographing the subject to create the image content. The image classifying means classifies the image content into a plurality of image groups on the basis of the photographing information. The image playback means organizes all still images belonging to one of the image groups into a single still-image slideshow, and successively plays back one or a plurality of movies belonging to the same image group as that to which the still images belong and the still-image slideshow. Preferably, the image classifying means classifies the image content into a plurality of image groups on the basis of photographing information concerning at least one of a photographing date when the subject was photographed, a photographing time when the subject was photographed, and a photographing location where the subject was photographed. The image playback means can obtain a photographing time of a still image that was first photographed among the plurality of still images organized into the still-image slideshow, and photographing times of the one or plurality of movies belonging to the same image group, and can chronologically play back the one or plurality of movies and the still-image slideshow according to the obtained photographing times.

According to the playback function of the image recording/playback apparatus 1 described above, even if two types of content exist, i.e., still images and movies, all the items of content can be used and played back. In addition, still images photographed with a certain range of conditions that are temporally or spatially close to each other can also be played back as a slideshow. For example, in a case where movies and still images were photographed at a certain sightseeing place, only the still images photographed at that sightseeing place are extracted and are organized into a slideshow. The still images to be played back together with the movies are temporally and spatially related to the movies. Therefore, effective playback in accordance with a real experience of the photographer can be achieved.

The image recording/playback apparatus 1 is provided with a recording section that basically includes image acquisition means (the imaging unit 10), image classifying means (the control unit 11), slideshow movie generating means (the image processing unit 17), playlist generating means (the control unit 11), and recording means (the DVD drive 15). As described above, the image acquisition means acquires image content including both still images and movies, and photographing information involved in photographing the subject to create the image content. The image classifying means classifies the image content into a plurality of image groups on the basis of the photographing information. The slideshow movie generating means organizes all still images belonging to one of the image groups into a single slideshow movie. The playlist generating means generates a playlist that defines an order in which one or a plurality of movies belonging to the same image group as that to which the still images belong and the slideshow movie are successively played back. The recording means records the slideshow movie, the one or plurality of movies, and the playlist onto a recording medium.

The image classifying means can classify the image content into a plurality of image groups on the basis of photographing information concerning at least one of a photographing date when the subject was photographed, the photographing time when the subject was photographed, and the photographing location where the subject was photographed. The playlist generating means can obtain a photographing time of a still image that was first photographed among the plurality of still images organized into the slideshow movie, and photographing times of the one or plurality of movies belonging to the same image group as that to which the still images belong, and can generate a playlist that defines an order in which the one or plurality of movies and the slideshow movie are chronologically played back according to the photographing times.

The playlist generating means can generate a playlist menu for each of the image groups obtained by the image classifying means. In this case, the playlist generating means can generate a playlist menu that is segmented for every predetermined number of images within each of the image groups obtained by the image classifying means. Alternatively, the playlist generating means may generate a playlist main menu for each of the image groups obtained by the image classifying means, and may further generate as a link from the main menu a playlist submenu that is segmented for every predetermined number of images. Furthermore, the playlist generating means can generate still image entries and movie entries in the playlist menu, and can place a link from each of the still image entries in the menu to a corresponding position within a slideshow movie including the still image associated therewith so that, when one of the still image entries is selected in the menu, playback can be started from the corresponding position within the slideshow movie. Depending on the situation, a map may be created on the basis of locations where individual images defined in the playlist were photographed, and the playlist and the map may be combined to generate a playback menu.

According to the recording function of the image recording/playback apparatus 1, classified items of content can be recorded on a DVD or the like so that the items of content can be easily played back using another device. A menu is recorded together with the items of content on the DVD or the like. For example, menus classified by sightseeing places can remind a user of his/her real experience. Furthermore, the menu of the DVD includes a main menu associated with each sightseeing place, and three submenus into which images classified into the main menu are further divided. A user can specify an image to be played back while viewing thumbnails or the like thereof. Although the still images are assembled into the slideshow movie, thumbnails of all the original still images are shown on the menu. One of the thumbnails is specified so that a still image associated with the specified thumbnail can be played back directly from a predetermined position in the slideshow movie. Therefore, a DVD in which movies and still images are merged can be created. Moreover, a map can be used to form a background or the like of a menu to provide a large amount of information. Since such a map is shown on every submenu, a detailed for each sightseeing place where photographing was performed map can be shown.

Figure 2:
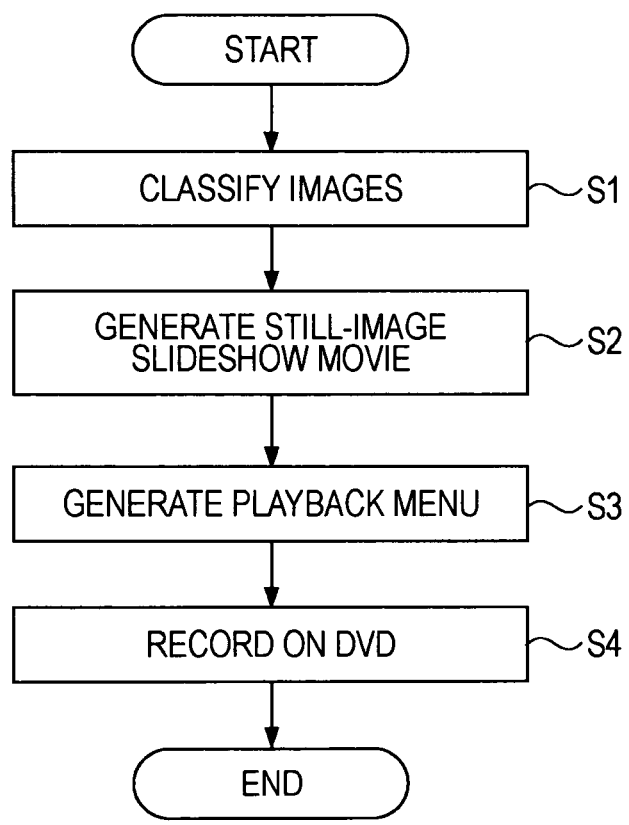
FIG. 2 is a flowchart illustrating the operation of the image recording/playback apparatus illustrated in FIG. 1.

FIG. 2 is a flowchart illustrating a DVD creation process (image content recording process) performed by the image recording/playback apparatus 1 illustrated in FIG. 1. First, in step S1, content including both movies and still images is classified into a plurality of image groups on the basis of photographing information. Then, in step S2, a plurality of still images included in each image group is organized into a slideshow movie. In step S3, a list that defines an order in which, for each image group, a movie and a slideshow movie are played back is generated, and a playback menu is generated for each image group. Finally, in step S4, a movie, a slideshow movie, and a playback menu for each image group are collectively recorded on a DVD.

Figure 3:
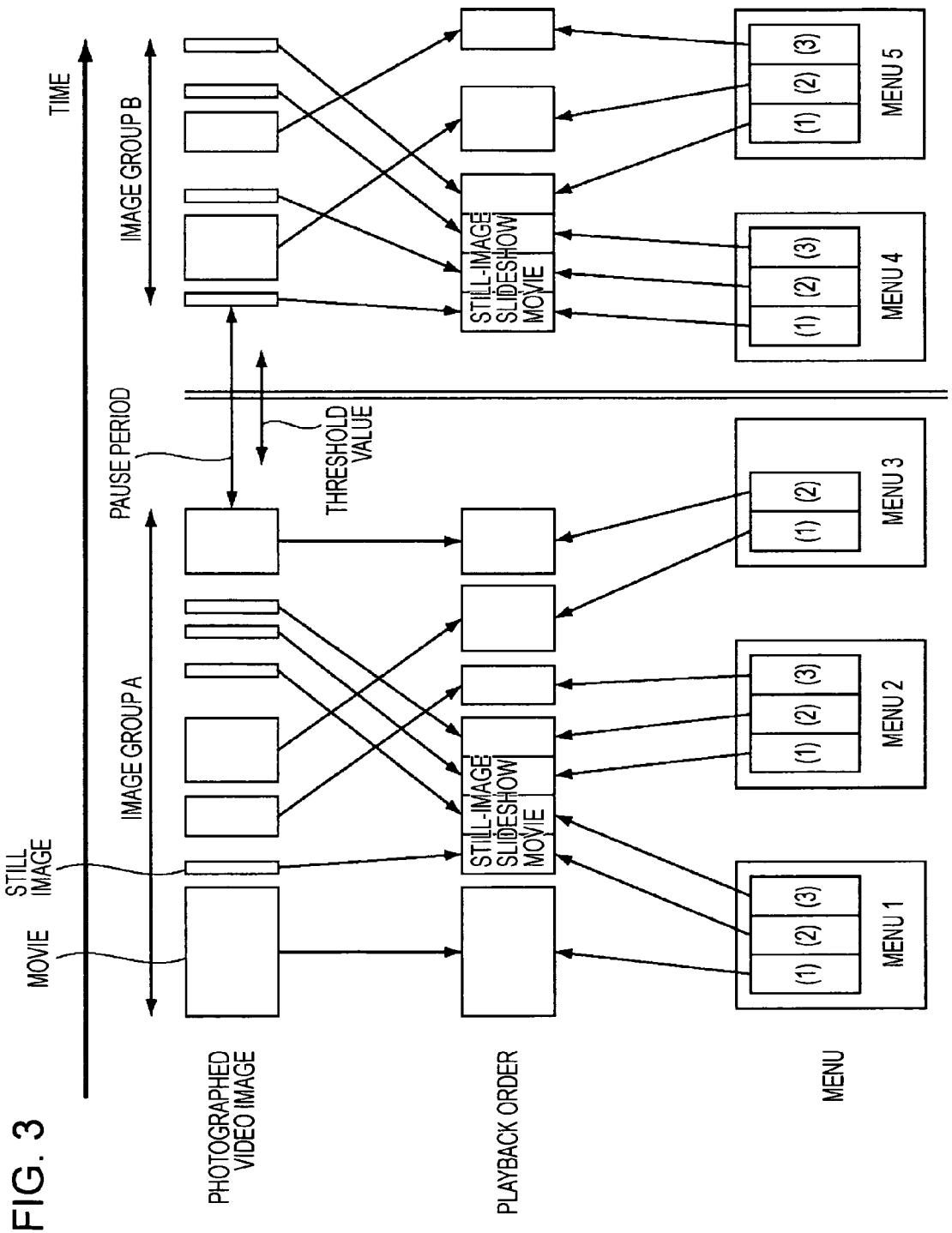
FIG. 3 is a schematic diagram illustrating the operation of the image recording/playback apparatus illustrated in FIG. 1.

FIG. 3 schematically illustrates the flow of the DVD creation process illustrated in FIG. 2. Initially, the processing of step S1, that is, the process of classifying images, is described in detail. A photographed video image is illustrated in the upper portion of FIG. 3. A change with time of still images and movies that were photographed at two sightseeing places is illustrated. In the photographed video image, a movie was first photographed for a long time and then a still image was photographed, followed by another movie. Subsequent still images and movies were captured in the manner illustrated in FIG. 3.

First, the photographed video image is classified on the basis of photographing information. Specifically, the photographed video image is classified in a general view such that the photographed video image is divided when photographing is paused for a period of time longer than a certain threshold value or when a change in the photographing location of each image has occurred in an amount greater than a certain threshold value. The classification of the video image may be performed on the basis of information regarding either photographing time or photographing location. In some cases, however, even when photographing is paused for a long period of time, a user may be staying at the same sightseeing place, or conversely, even when a change in photographing location has occurred in an amount greater than a certain threshold value, a user may be traveling by train. In such a case, a problem occurs if images photographed at the sightseeing place or pictures photographed during the travel by train are classified into the same image group. It is therefore desirable that, with general consideration of both photographing time and photographing location, image content including both movies and still images be classified into a plurality of image groups. In the present embodiment, for each photographed image, it is determined whether a pause period during which photographing is stopped exceeds a threshold value. If a portion for which the pause period exceeds the threshold value is found and a change in photographing location has also occurred in an amount greater than a threshold value at that portion, the whole image content is divided into a first half image group A and a second half image group B.

Then, the processing of step S2, that is, the process of generating a still-image slideshow movie, is described. All still images included in each of the obtained image groups A and B are organized to produce a single still-image slideshow movie. A plurality of still images are chronologically arranged on the basis of their respective photographing times, and are assembled into a slideshow in such a manner that effects such as fading are applied. While the still images are basically arranged in a chronological order, a certain still image may be shown a plurality of times to produce a slideshow. Even in this case, a point that is representative of each of the still images, namely, a time code, is stored.

Next, the processing of step S3, that is, the process of generating a playback menu, is described. For each image group, a playlist that defines an order in which a movie and a still-image slideshow movie are played back is created. Specifically, a playback order of a still-image slideshow movie is based on with the photographing time of the first or oldest still image, in terms of photographing time, among the still images included in the still-image slideshow movie, and the photographing time of the first still image is compared with the photographing times of other movies to chronologically determine an order in which the still-image slideshow movie and the movies are played back. In this embodiment, the playback order shown in the middle portion of FIG. 3 is obtained.

Next, a playback menu for DVD recording is generated. Each menu shows a map, as a background, and thumbnails, and includes three entries. Each entry includes a thumbnail and other related information. When an entry is specified, playback can be started from the corresponding time code of the corresponding movie or still-image slideshow movie.

Based on the playback order illustrated in FIG. 3, movies and still images are divided into three sections to form a single menu. The image group A contains eight images including movies and still images, and are assigned three menus. Entry 1 of menu 1 shows the thumbnail of a movie A, and includes a link to the movie A. Entry 2 of menu 1 includes a link to a time code that is representative of the first still image of the still-image slideshow movie. Accordingly, menus 1 to 3 are generated.

A similar process is performed on the image group B. When menus are to be created, although entry 3 of menu 3 is available, a new menu, i.e., menu 4, is created for a different image group. This is because of the difficulty in identifying a place where photographing was performed on the occasion of displaying a map. That is, in a case where a map showing a range including locations at which three images were photographed is displayed on each menu, images within different groups, which were photographed at distant points, might be arranged into one menu and a wider area map might be presented. This makes it difficult to correctly identify the points where photographing was performed. In this way, different image groups do not share a menu. Menus 4 and 5 are generated in the image group B in the manner described above. Then, the process of generating all menus is completed. In the present embodiment, menus are configured only in a single layer, by way of example. Alternatively, the menus described above may be configured as submenus, and a main menu including entries for each image group may further be configured as an upper-level menu. Map data is read from the ROM 12 according to location information associated with each image, and is assembled in an entry of a menu.

Finally, the processing of step S4, that is, the DVD recording process, is described. In step S4, the menus generated in the way described above, the still-image slideshow movie, and normal movies are recorded on a DVD Recordable (DVD-R) disc or the like according to the DVD specification. While the present embodiment has been described in the context of the recording on a DVD, the concept of generating a still-image slideshow movie and configuring a menu may be applied to Blu-ray Disc® or other recording media.

Figure 4:
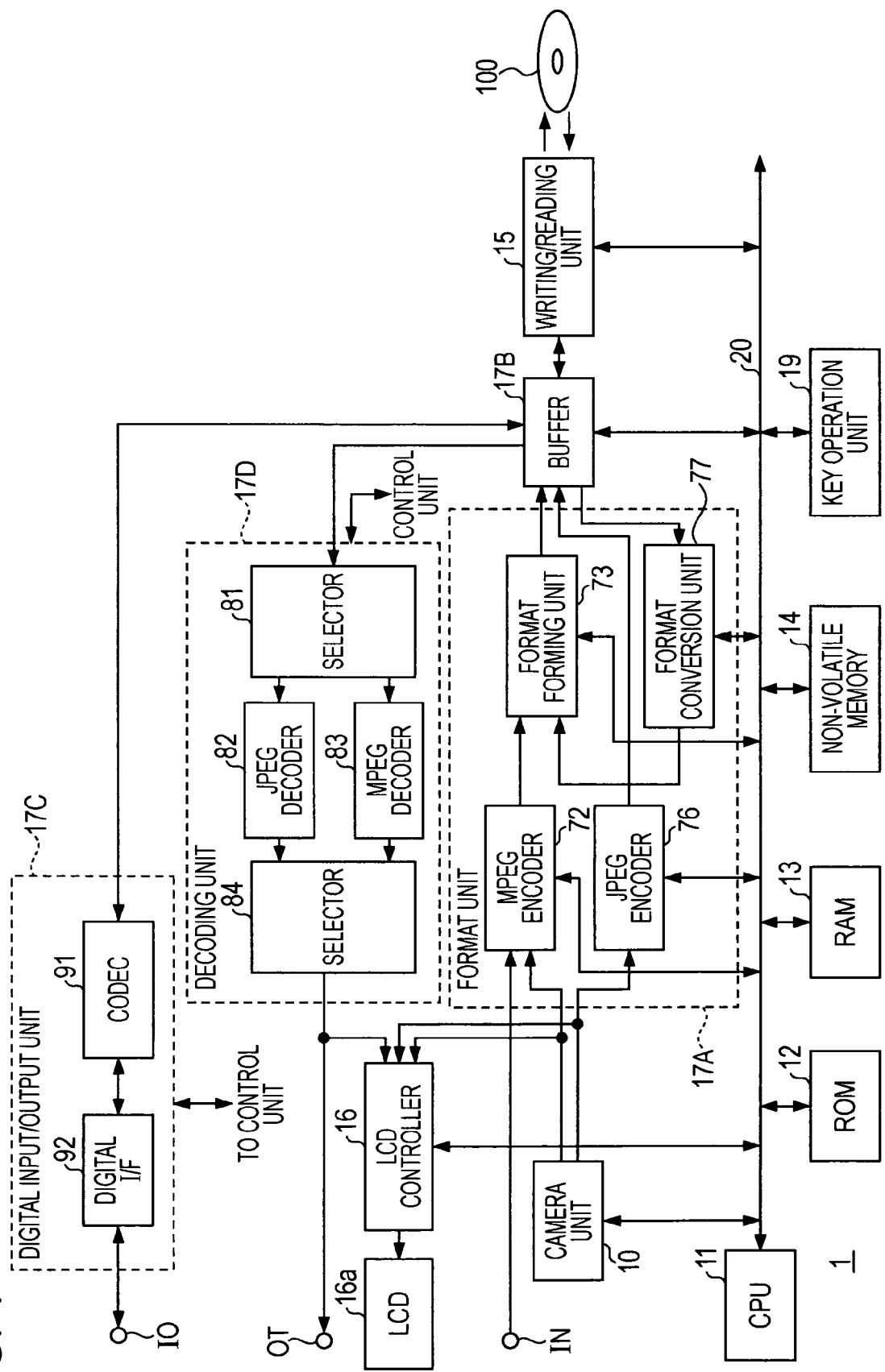
FIG. 4 is a block diagram illustrating a specific example of the image recording/playback apparatus illustrated in FIG. 1.

FIG. 4 is a block diagram illustrating an example of the image recording/playback apparatus 1 according to the embodiment of the present invention. In this example, the image recording/playback apparatus 1 employing an image recording system and image playback system according to an embodiment of the present invention is implemented as a DVD video camera (hereinafter referred to as a "DVD video camera 1") by way of example. In the DVD video camera 1, a writable DVD is used as a recording medium. For ease of understanding, components corresponding to those of the image recording/playback apparatus 1 illustrated in FIG. 1 are assigned the corresponding reference numerals.

Referring to FIG. 4, a DVD 100 may be a recording medium that is placed in the DVD video camera 1 to record movie data and still image data. The DVD video camera 1 is capable of supporting two digital movie formats, i.e., DVD Video format and DVD Video Recording format, as described below.

The DVD video camera 1 is thus capable of initializing a writable DVD placed in the DVD video camera 1 into the DVD Video format or the DVD Video Recording format for use according to an instruction given from a user.

As illustrated in FIG. 4, the DVD video camera 1 includes a camera unit 10, a format unit 17A including an MPEG (Moving Picture Experts Group) encoder 72, a format forming unit 73, a JPEG (Joint Photographic Experts Group) encoder 76, and a format conversion unit 77, a buffer memory 17B used for recording and playback, and a writing/reading unit 15.

As illustrated in FIG. 4, the DVD video camera 1 further includes a decoding unit 17D used for playback, and a digital input/output unit 17C that receives and transmits digital data. The decoding unit 17D includes selectors 81 and 84, a JPEG decoder 82, and an MPEG decoder 83. The digital input/output unit 17C includes a codec 91 and a digital interface (hereinafter referred to as a "digital I/F") 92. The format unit 17A, the buffer memory 17B, the digital input/output unit 17C, and the decoding unit 17D correspond to the image processing unit 17 illustrated in FIG. 1.

As illustrated in FIG. 4, the digital input/output unit 17C is connected to a digital input/output terminal IO, and is configured to transmit and receive digital data to and from another device via the digital input/output terminal IO. Information subjected to decoding and digital-to-analog (D/A) conversion by the decoding unit 17D, such as image information, is output through an analog output terminal OT and can be supplied to an external device such as a monitor receiver.

An analog video signal or analog audio signal from an external device is input to the MPEG encoder 72 through an input terminal IN, where the input signal is subjected to analog-to-digital (A/D) conversion and compression according to the MPEG standard. The result can be recorded on the DVD 100.

The DVD video camera 1 further includes a liquid crystal display (LCD) controller 16 and an LCD 16a, and is configured to display an image currently captured by the camera unit 10 or a playback image that is based on image data recorded on the DVD 100 on the LCD 16a so that the user can observe the displayed image. Although not illustrated in FIG. 4, the DVD video camera 1 may further include a viewfinder configured to view an image currently captured by the camera unit 10.

Referring to FIG. 4, the control unit 11 is formed of a CPU, and controls the operation of the DVD video camera 1. The CPU 11 is connected to a ROM 12, a RAM 13, a non-volatile memory 14, and a key operation unit 19 through a bus 20. The ROM 12 has recorded thereon various programs executable by the CPU 11 and data necessary for processing. The data includes map data. The RAM 13 is primarily used as a work area in which intermediate results obtained during processing are temporarily stored. The non-volatile memory 14 is capable of holding stored information even if the power is turned off, and is configured to store and hold various setting parameters and necessary intermediate results obtained during processing. A user operates the key operation unit 19 to input various instructions to the DVD video camera 1. An instruction given from the user through the key operation unit 19 is supplied as an electrical signal to the CPU 11. Thus, the CPU (control unit) 11 can control the individual units according to an instruction given from the user so that the DVD video camera 1 can perform an operation corresponding to the instruction given from the user.

As described below, the DVD video camera 1 is capable of photographing the subject as a movie and recording the movie on a DVD, and is also capable of photographing the subject as a still image and recording the still image on a DVD.

That is, the camera unit 10 of the DVD video camera 1 includes a CCD sensor, and also has an electronic shutter function. The user of the DVD video camera 1 operates a predetermined operation key of the key operation unit 19 to bring the DVD video camera 1 into a standby mode in which photographing can be started at any time, and operates a photographing start key (REC key) of the key operation unit 19 to photograph an image currently captured by the camera unit 10 as a movie to record it on the DVD 100.

In this case, a movie signal from the camera unit 10 is supplied to the MPEG encoder 72, where the signal is A/D converted into digital movie data. Then, the digital movie data is compressed according to the MPEG standard and is supplied to the format forming unit 73. The format forming unit 73 forms, under the control of the control unit 11, data for recording that complies with the recording format (digital movie format) of the DVD 100 placed in the DVD video camera 1, and supplies the resulting data to the buffer memory 17B.

The writing/reading operation of the buffer memory 17B is controlled by control unit 11. During recording, the buffer memory 17B performs time axis correction on the data for recording between the DVD video camera 1 and the DVD 100 so that all items of data for recording can be recorded on the DVD 100 without failure.

The buffer memory 17B is used in a first in first out (FIFO) manner. During the recording of a movie, items of data for recording supplied from the format forming unit 73 are sequentially written to the buffer memory 17B, and, at the same time, items of data for recording recorded on the buffer memory 17B are read and are supplied to the writing/reading unit 15.

The writing/reading unit 15 is provided with an optical pickup, a two-axis actuator, and a sled motor, each of which is not illustrated, and is configured to record the items of data for recording at predetermined positions of the DVD 100 placed in the DVD video camera 1 under the control of the control unit 11. In this way, the DVD video camera 1 can record a movie photographed using the camera unit 10 in the form of digital data onto the DVD 100, which is a recording medium placed in the DVD video camera 1.

In a case where the DVD video camera 1 is brought into the standby mode and a shutter key of the key operation unit 19 is operated, the electronic shutter of the camera unit 10 is enabled to photograph an image currently captured by the camera unit 10 as a still image to record it on the DVD 100.

In this case, a still image signal from the camera unit 10 is supplied to the JPEG encoder 76, where the signal is A/D converted into digital still image data. Then, the digital still image data is compressed according to the JPEG standard to form data for recording that complies with the JPEG format (digital still image format). The data for recording sent from the JPEG encoder 76 is supplied to the writing/reading unit 15 through the buffer memory 17B, and is recorded as still image data onto the DVD 100 placed in the DVD video camera 1 through the writing/reading unit 15.

In this way, the DVD video camera 1 is configured to record movie data complying with the digital movie format and still image data complying with the digital still image format at appropriate positions on the DVD 100, which is a recording medium, each time photographing is performed, so that both movie data and still image data can be recorded on the DVD 100. That is, a recording area of movie data and a recording area of still image data are not separately provided in advance on the DVD 100, which is a recording medium.

The storage capacity of a DVD can be effectively utilized without causing wasteful use thereof due to previous reservation of a recording area of still image data although no still images are to be photographed. Thus, both movie data and still image data can be efficiently recorded regardless of the type of the image data.

Therefore, the DVD video camera 1 is configured to compress a movie according to the MPEG standard and to record it on a DVD using a predetermined digital movie format. The DVD video camera 1 is also configured to compress a still image according to the JPEG standard and to record it on the DVD 100 placed therein using the digital still image format.

At a timing in accordance with an instruction given from the user or at a timing when the control unit 11 determines that the DVD 100 used for recording is to be removed, the DVD video camera 1 performs a process of the reading still image data recorded using the digital still image format from the DVD 100 used for recording, converting the read data into data complying with the digital movie format (i.e., slideshow movie), and additionally recording the resulting data on the DVD 100. A benefit of the present invention is that the reading of still images is performed for each preset image group. All still image data items included in one image group are read and converted into data complying with the digital movie format, and the resulting data is additionally recorded on the DVD 100. A playback menu is further created in a manner described above, and is also recorded on the DVD 100.

Specifically, at a timing in accordance with an instruction given from the user or at a timing when the control unit 11 determines as necessary, still image data items belonging to a single image group among all still image data items recorded using the digital still image format on the DVD 100 used for recording are read through the writing/reading unit 15, and are supplied to the format conversion unit 77 through the buffer memory 17B.

The format conversion unit 77 converts the still image data complying with the digital still image format (still image data compressed according to the JPEG standard) read from the DVD 100 through the writing/reading unit 15 into MPEG I-picture data. That is, the format conversion unit 77 serves as a JPEG/I-picture conversion unit configured to convert still image data, which can be decoded only using a JPEG decoder, into data that can be decoded using an MPEG decoder.

The still image data converted by the format conversion unit 77 into MPEG I-picture data is supplied to the format forming unit 73. As described above, the format forming unit 73 is configured to form data for recording that complies with a predetermined digital movie format, i.e., in this embodiment, the DVD Video format or DVD Video Recording format, on the basis of the data to be recorded.

Upon receiving the still image data converted into MPEG I-picture data from the format conversion unit 77, the format forming unit 73 organizes all the still image data items converted into MPEG I-picture data into a set of data items (data items corresponding to one chapter, that is, a still-image slideshow movie), and forms data for recording that complies with a predetermined digital movie format. The thus formed data for recording is recorded on the DVD 100 through the buffer memory 17B and the writing/reading unit 15 in the manner described above.

Accordingly, the DVD video camera 1 is configured such that, for example, movie data acquired by performing photographing can be compressed according to the MPEG standard and can be recorded using a predetermined digital movie format, and still image data acquired by performing photographing can be recorded using a predetermined digital still image format such as the JPEG format.

Furthermore, the DVD video camera 1 is configured to convert still image data recorded using the digital still image format into MPEG I-picture data for each image group that is set on the basis of photographing information, and to additionally record the resulting data on a DVD together with movie data belonging to the same image group. A playlist that defines the playback order and a playback menu are further generated every image group, and are recorded on the DVD together with the still-image slideshow movie and normal movie or movies.

A movie and a still-image slideshow movie classified for each image group and recorded on the disc 100 are played back according to the playlist recorded together on the disc 100. Specifically, a movie and a slideshow movie that belong to one image group are read from the disc 100 using the writing/reading unit 15, and are stored in the buffer memory 17B. Under the control of the CPU 11, the movie and still-image slideshow movie stored in the buffer memory 17B are supplied to the decoding unit 17D. The selector 81 supplies the movie data and the slideshow movie data to the MPEG decoder 83 according to the predetermined order defined in the playlist, and the movie data and the slideshow movie data are supplied to the output terminal OT or the LCD controller 16 through the selector 84 on the output side. The LCD controller 16 plays back and displays the movie and the slideshow movie, which belong to the same image group, on the LCD 16a according to a predetermined order on the basis of a video signal output from the selector 84.

It should be understood by those skilled in the art that various modifications, combinations, sub-combinations and alterations may occur depending on design requirements and other factors insofar as they are within the scope of the appended claims or the equivalents thereof.

What is claimed is:

1. An image playback apparatus comprising:
   an imaging unit for acquiring image content including still images and movies and photographing information involved in photographing a subject to create the image content;

a control unit for classifying the image content into a plurality of image groups on the basis of the photographing information and for controlling an image processing and display process of organizing all still images belonging to one of the image groups into a still-image slideshow and successively playing back one or a plurality of movies belonging to the one image group and the still-image slideshow, wherein for each still image and movie it is determined whether or not a period between acquisition of an immediately prior still image or movie and acquisition of the still image or movie exceeds a period-duration threshold value, and whether or not a change in acquisition location, exceeding a change-in-acquisition-location threshold value, has occurred between acquisition of the immediately prior still image or movie and acquisition of the still image or movie, wherein if it is determined that the period exceeds the period-duration threshold value, and that a change in acquisition location has occurred and exceeds the change-in-acquisition-location threshold value, the still image or movie is assigned to an image group that is different from an image group to which the immediately prior still image or movie is assigned, and wherein a playlist menu is generated for each of the image groups and, for each group, the corresponding playlist menu includes a map as background, the map indicating acquisition locations for image content in the group.

2. The image playback apparatus according to claim 1, wherein the image processing and display process comprises obtaining a photographing time of a still image that was first photographed among the still images organized into the still-image slideshow, and photographing times of the one or plurality of movies belonging to the one image group, and chronologically playing back the one or plurality of movies and the still-image slideshow according to the obtained photographing times.

3. An image recording apparatus comprising:

an imaging unit for acquiring image content including still images and movies, and photographing information involved in photographing a subject to create the image content;

a control unit for classifying the image content into a plurality of image groups on the basis of the photographing information and for controlling an image processing and display process of organizing all still images belonging to one of the image groups to generate a slideshow movie;

wherein the control unit generates a playlist that defines an order in which one or a plurality of movies belonging to the one image group and the slideshow movie are successively played back; and a writing/reading unit for recording the slideshow movie, the one or plurality of movies, and the playlist onto a recording medium, wherein for each still image and movie it is determined whether or not a period between acquisition of an immediately prior still image or movie and acquisition of the still image or movie exceeds a period-duration threshold value, and whether or not a change in acquisition location, exceeding a change-in-acquisition-location threshold value, has occurred between acquisition of the immediately prior still image or movie and acquisition of the still image or movie, wherein if it is determined that the period exceeds the period-duration threshold value, and that a change in acquisition location has occurred and exceeds the change-in-acquisition-location threshold value, the still image or movie is assigned to an image group that is different from an image group to which the immediately prior still image or movie is assigned, and wherein a playlist menu is generated for each of the image groups and, for each group, the corresponding playlist menu includes a map as background, the map indicating acquisition locations for image content in the group.

4. The image recording apparatus according to claim 3, wherein the control unit obtains a photographing time of a still image that was first photographed among the still images organized into the slideshow movie, and photographing times of the one or plurality of movies belonging to the one image group, and generates a playlist that defines an order in which the one or plurality of movies and the slideshow movie are chronologically played back according to the photographing times.

5. The image recording apparatus according to claim 3, wherein the control unit generates a playlist menu that is segmented for every predetermined number of images within each of the image groups.

6. The image recording apparatus according to claim 3, wherein the control unit generates a playlist main menu for each of the image groups, and further generates as a link from the playlist main menu a playlist submenu that is segmented for every predetermined number of images.

7. The image recording apparatus according to claim 3, wherein the control unit generates still image entries and movie entries in the playlist menu, and places a link from each of the still image entries in the menu to a corresponding position within a slideshow movie including a still image associated with the linked still image entry so that, when one of the still image entries is selected in the menu, playback can be started from the corresponding position within the slideshow movie.

8. The image recording apparatus according to claim 3, wherein in the case of creating a menu for each of the image groups, the control unit handles still images included in each of the image groups as a slideshow movie and generates a playlist menu.

9. An image recording apparatus comprising:

an imaging unit for acquiring image content including still images and movies, and photographing information involved in photographing a subject to create the image content;

a control unit for classifying the image content into a plurality of image groups on the basis of the photographing information and for controlling an image processing and display process of organizing all still images belonging to each of the image groups to generate a slideshow movie;

a control unit for generating a playlist that defines an order in which one or a plurality of movies belonging to the same image group as the image group to which the still images belong and the slideshow movie are successively played back, and for creating a map on the basis of locations where individual images defined in the playlist were photographed, and combining the playlist and the map to generate a playback menu; and a writing/reading unit for recording the slideshow movie, the one or plurality of movies, and the playback menu onto a recording medium, wherein for each still image and movie it is determined whether or not a period between acquisition of an immediately prior still image or movie and acquisition of the still image or movie exceeds a period-duration threshold value, and whether or not a change in acquisition location, exceeding a change-in-acquisition-location threshold value, has occurred between acquisition of the immediately prior still image or movie and acquisition of the still image or movie, wherein if it is determined that the period exceeds the period-duration threshold value, and that a change in acquisition location has occurred and exceeds the change-in-acquisition-location threshold value, the still image or movie is assigned to an image group that is different from an image group to which the immediately prior still image or movie is assigned, and wherein a playlist menu is generated for each of the image groups and, for each group, the corresponding playlist menu includes a map as background, the map indicating acquisition locations for image content in the group.

10. An image playback method comprising the steps of:

acquiring image content including still images and movies and photographing information involved in photographing a subject to create the image content;

classifying the image content into a plurality of image groups on the basis of the photographing information; and organizing all still images belonging to one of the image groups into a still-image slideshow and successively playing back one or a plurality of movies belonging to the one image group and the still-image slideshow, wherein for each still image and movie it is determined whether or not a period between acquisition of an immediately prior still image or movie and acquisition of the still image or movie exceeds a period-duration threshold value, and whether or not a change in acquisition location, exceeding a change-in-acquisition-location threshold value, has occurred between acquisition of the immediately prior still image or movie and acquisition of the still image or movie, wherein if it is determined that the period exceeds the period-duration threshold value, and that a change in acquisition location has occurred and exceeds the change-in-acquisition-location threshold value, the still image or movie is assigned to an image group that is different from an image group to which the immediately prior still image or movie is assigned, and wherein a playlist menu is generated for each of the image groups and, for each group, the corresponding playlist menu includes a map as background, the map indicating acquisition locations for image content in the group.

11. An image recording method comprising the steps of:

acquiring image content including still images and movies, and photographing information involved in photographing a subject to create the image content;

classifying the image content into a plurality of image groups on the basis of the photographing information;

organizing all still images belonging to one of the image groups to generate a slideshow movie;

generating a playlist that defines an order in which one or a plurality of movies belonging to the one image group and the slideshow movie are successively played back; and recording the slideshow movie, the one or plurality of movies, and the playlist onto a recording medium, wherein for each still image and movie it is determined whether or not a period between acquisition of an immediately prior still image or movie and acquisition of the still image or movie exceeds a period-duration threshold value, and whether or not a change in acquisition location, exceeding a change-in-acquisition-location threshold value, has occurred between acquisition of the immediately prior still image or movie and acquisition of the still image or movie, wherein if it is determined that the period exceeds the period-duration threshold value, and that a change in acquisition location has occurred and exceeds the change-in-acquisition-location threshold value, the still image or movie is assigned to an image group that is different from an image group to which the immediately prior still image or movie is assigned, and wherein a playlist menu is generated for each of the image groups and, for each group, the corresponding playlist menu includes a map as background, the map indicating acquisition locations for image content in the group.

12. An image recording method comprising the steps of:

acquiring image content including still images and movies, and photographing information involved in photographing a subject to create the image content;

classifying the image content into a plurality of image groups on the basis of the photographing information;

organizing all still images belonging to each of the image groups to generate a slideshow movie;

generating a playlist that defines an order in which one or a plurality of movies belonging to the same image group as the image group to which the still images belong and the slideshow movie are successively played back; and creating a map on the basis of locations where individual images defined in the playlist were photographed, and combining the playlist and the map to generate a playback menu; and recording the slideshow movie, the one or plurality of movies, and the playback menu onto a recording medium, wherein for each still image and movie it is determined whether or not a period between acquisition of an immediately prior still image or movie and acquisition of the still image or movie exceeds a period-duration threshold value, and whether or not a change in acquisition location, exceeding a change-in-acquisition-location threshold value, has occurred between acquisition of the immediately prior still image or movie and acquisition of the still image or movie, wherein if it is determined that the period exceeds the period-duration threshold value, and that a change in acquisition location has occurred and exceeds the change-in-acquisition-location threshold value, the still image or movie is assigned to an image group that is different from an image group to which the immediately prior still image or movie is assigned, and wherein a playlist menu is generated for each of the image groups and, for each group, the corresponding playlist menu includes a map as background, the map indicating acquisition locations for image content in the group.

13. An image playback apparatus comprising:

an imaging unit to acquire image content including still images and movies and photographing information involved in photographing a subject to create the image content;

a control unit to classify the image content into a plurality of image groups on the basis of the photographing information and for controlling an image processing and display process to organize all still images belonging to one of the image groups into a still-image slideshow and successively play back one or a plurality of movies belonging to the one image group and the still-image slideshow, wherein for each still image and movie it is determined whether or not a period between acquisition of an immediately prior still image or movie and acquisition of the still image or movie exceeds a period-duration threshold value, and whether or not a change in acquisition location, exceeding a change-in-acquisition-location threshold value, has occurred between acquisition of the immediately prior still image or movie and acquisition of the still image or movie, wherein if it is determined that the period exceeds the period-duration threshold value, and that a change in acquisition location has occurred and exceeds the change-in-acquisition-location threshold value, the still image or movie is assigned to an image group that is different from an image group to which the immediately prior still image or movie is assigned, and wherein a playlist menu is generated for each of the image groups and, for each group, the corresponding playlist menu includes a map as background, the map indicating acquisition locations for image content in the group.

14. An image recording apparatus comprising:

an imaging unit to acquire image content including still images and movies, and photographing information involved in photographing a subject to create the image content;

a control unit to classify the image content into a plurality of image groups on the basis of the photographing information and for controlling an image processing and display process to organize all still images belonging to one of the image groups to generate a slideshow movie;

wherein the control unit generates a playlist that defines an order in which one or a plurality of movies belonging to the one image group and the slideshow movie are successively played back; and a writing/reading unit to record the slideshow movie, the one or plurality of movies, and the playlist onto a recording medium, wherein for each still image and movie it is determined whether or not a period between acquisition of an immediately prior still image or movie and acquisition of the still image or movie exceeds a period-duration threshold value, and whether or not a change in acquisition location, exceeding a change-in-acquisition-location threshold value, has occurred between acquisition of the immediately prior still image or movie and acquisition of the still image or movie, wherein if it is determined that the period exceeds the period-duration threshold value, and that a change in acquisition location has occurred and exceeds the change-in-acquisition-location threshold value, the still image or movie is assigned to an image group that is different from an image group to which the immediately prior still image or movie is assigned, and wherein a playlist menu is generated for each of the image groups and, for each group, the corresponding playlist menu includes a map as background, the map indicating acquisition locations for image content in the group.

15. An image recording apparatus comprising:

an imaging unit to acquire image content including still images and movies, and photographing information involved in photographing a subject to create the image content;

a control unit to classify the image content into a plurality of image groups on the basis of the photographing information and for controlling an image processing and display process to organize all still images belonging to each of the image groups to generate a slideshow movie;

a control unit to generate a playlist that defines an order in which one or a plurality of movies belonging to the same image group as the image group to which the still images belong and the slideshow movie are successively played back; and to create a map on the basis of locations where individual images defined in the playlist were photographed, and combining the playlist and the map to generate a playback menu; and a writing/reading unit to record the slideshow movie, the one or plurality of movies, and the playback menu onto a recording medium, wherein for each still image and movie it is determined whether or not a period between acquisition of an immediately prior still image or movie and acquisition of the still image or movie exceeds a period-duration threshold value, and whether or not a change in acquisition location, exceeding a change-in-acquisition-location threshold value, has occurred between acquisition of the immediately prior still image or movie and acquisition of the still image or movie, wherein if it is determined that the period exceeds the period-duration threshold value, and that a change in acquisition location has occurred and exceeds the change-in-acquisition-location threshold value, the still image or movie is assigned to an image group that is different from an image group to which the immediately prior still image or movie is assigned, and wherein a playlist menu is generated for each of the image groups and, for each group, the corresponding playlist menu includes a map as background, the map indicating acquisition locations for image content in the group.

* * * * *